United States Patent [19]

McGrath

[11] 4,286,856

[45] Sep. 1, 1981

[54] ELECTROMAGNETIC SHUTTER FOR LENS

[76] Inventor: Neal McGrath, 1223 E. Wilson, Wheaton, Ill. 60187

[21] Appl. No.: 120,360

[22] Filed: Feb. 11, 1980

[51] Int. Cl.³ .......................... G03B 9/10; G03B 1/00
[52] U.S. Cl. ..................................... 354/234; 354/120
[58] Field of Search .............. 354/233, 234, 258, 120, 354/122, 50

[56] References Cited

U.S. PATENT DOCUMENTS

| 2,702,500 | 2/1955 | De Bell | 354/234 |
| 3,323,432 | 6/1967 | Rabanit | 354/120 X |
| 3,336,852 | 8/1967 | Levin | 354/234 |
| 3,558,226 | 1/1971 | Riggs et al. | 354/120 X |
| 3,638,550 | 2/1972 | Hereford | 354/234 |
| 3,712,202 | 1/1973 | Lang | 354/234 |
| 4,106,034 | 8/1978 | Mills | 354/50 X |

Primary Examiner—Donald A. Griffin
Attorney, Agent, or Firm—Keil & Witherspoon

[57] ABSTRACT

An electromagnetic shutter for a photographic lens is disclosed. The shutter comprises an optical stop mounted between focusing elements with a flap mounted for rotating substantially along one side of said stop. The flap has a first position in which it blocks the passage of light through the stop and a second position in which it is removed therefrom. An electromagnetic means for rotating the flap from its first position to its second position comprises a permanent magnet mounted on said rotatable shaft and an electromagnet having a horseshoe-shaped core with two poles which surround the permanent magnet. When the electromagnet is energized, the magnetic field produced causes said permanent magnet and attached shaft to rotate, thereby rotating the flap from its first position to its second position and thereby opening the shutter. A spring returns the flap to its first position when the electromagnet is not energized, thereby closing the shutter.

5 Claims, 11 Drawing Figures

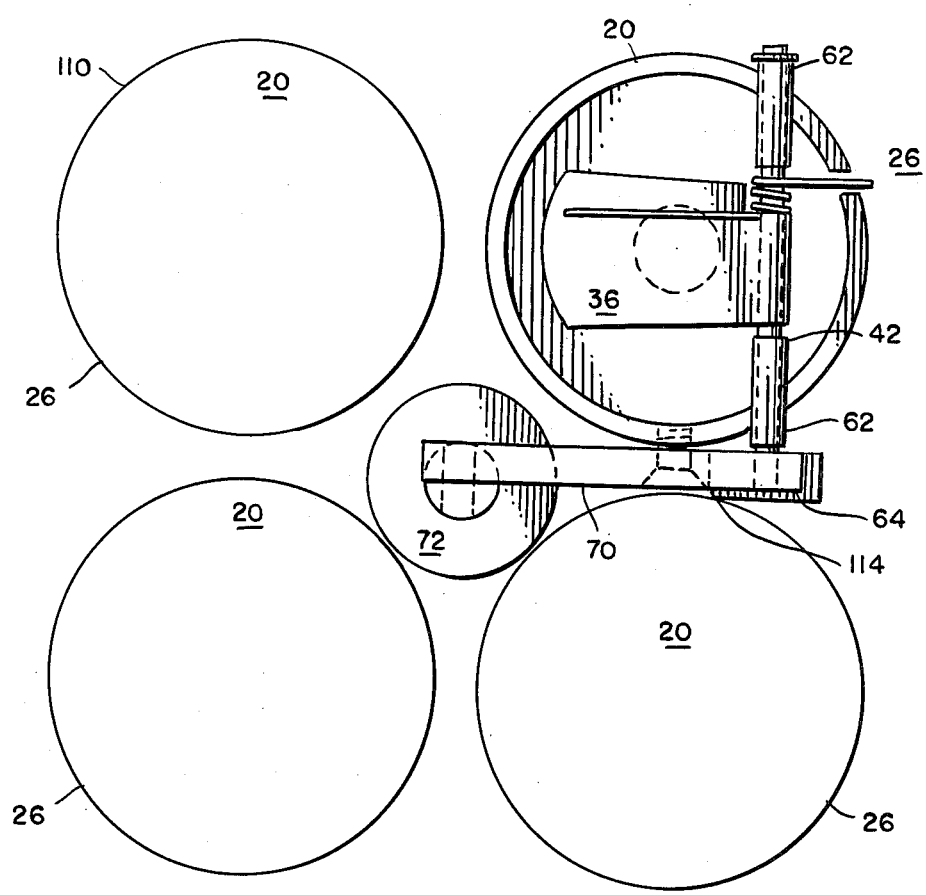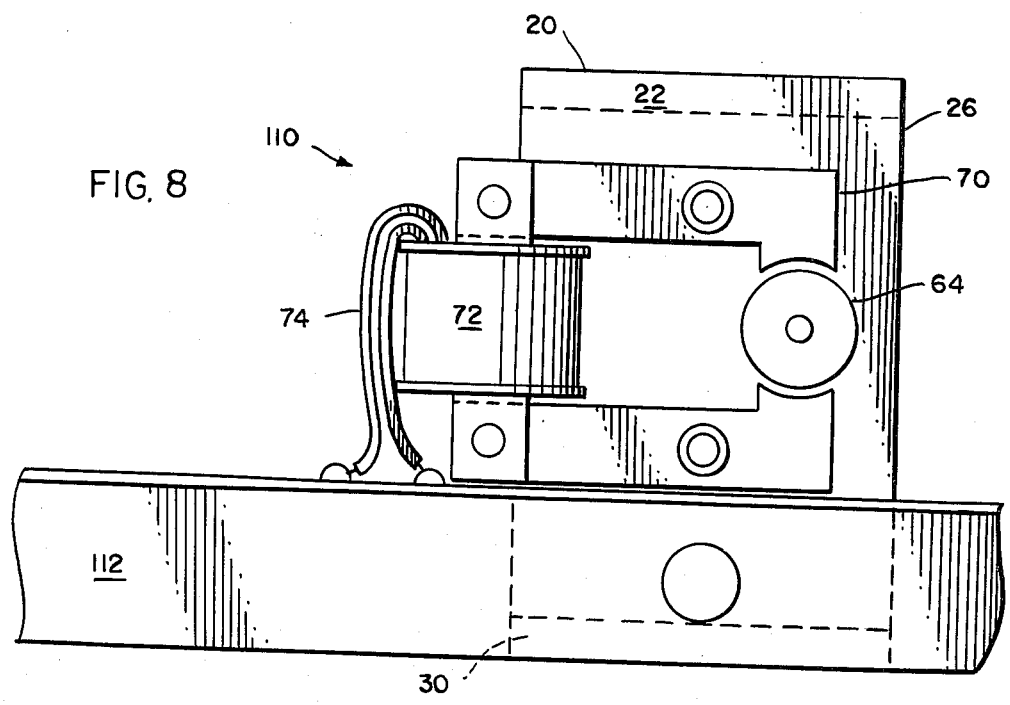

ELECTROMAGNETIC SHUTTER FOR LENS

BACKGROUND OF THE INVENTION

1. Field of the Invention

The invention relates to a shutter mechanism for a photographic lens. More particularly, the invention relates to an electromagnetic means for remotely causing the shutter to open and close. The invention applies in particular to the art of clustering a group of similar lenses for the purpose of providing sequential photographic views on one sheet of film of images presented upon an oscillascope screen.

The invention makes possible close packing of lenses for instruments used in the medical field. In particular, a group of closely packed lens is very useful for obtaining multiple views of nuclear medicine studies, ultrasound studies, computed axial topography scans, X-ray fluoroscopy examinations, and other examinations of the human body in which multiple images are produced. The overall instrument containing the cluster of lenses is called in the art, a multiformat image camera.

The invention has an application in the medical field where it is desirable to place several images from an oscilloscope screen or a television picture tube on a single sheet of film. The images appear sequentially on the oscilloscope tube, and are placed side by side on the sheet of film. Each lens in the cluster focuses one image of the screen onto the film at a position which corresponds to that lens.

The lens cluster makes it possible to place a number of images at particular positions on the film. The electromagnetic-shutter mechanism makes it possible to cluster large aperture lenses in a practical size cluster.

2. Prior Art

Heretofore it has been difficult to build a cluster of lenses with electrically operated shutters, the problem being where to locate the shutter operating mechanism.

An unsatisfactory solution which has been employed in the past has been to attach a solenoid to the outside of the lens body. When the solenoid is energized it pulls a soft iron core which is movably inserted into the solenoid. The core moves into the solenoid under the influence of electromagnetism, thereby pulling a lever which causes the shutter to open. A solenoid is unsatisfactory for several reasons, a principal one being that translational motion of the soft iron core must be converted into other motion in order to open the shutter. The conversion of linear motion requires a crank, pin joints, and much hardware which is subject to wear and misadjustment.

An even less satisfactory method of providing multiple views of an oscilloscope screen on one photographic film is to use one movable lens, rather than a cluster, and to move the lens to a different position for each view. Such systems tend to be very complex in design and expensive to manufacture and maintain.

An additional problem in the art of placing multiple views of an oscilloscope screen on a single photographic film is the problem of using lenses of large aperture. It is advantageous to utilize such large aperture lenses in order to minimize the time required for exposure of the photographic film. Shutters available in the prior art for such lenses are large and bulky. Large and bulky shutters occupy much space. Thus, in mounting such lenses in a cluster to provide multiple views, it is not possible to obtain a favorable ratio of area of lens glass to total area of the cluster. The shutters occupy much area and thereby reduce the amount of glass which the cluster can have. With the area of glass so restricted, large aperture lenses cannot be mounted within a cluster of practical size.

BRIEF DESCRIPTION OF THE INVENTION

The present invention solves the problem of bulky remotely operated shutter assemblies by using a permanent magnet as the armature of a direct current motor. The shutter is opened by electrically magnetizing a horseshoe-shaped pole piece. Magnetization of the pole piece applies magnetic forces to the permanent magnet and causes it to rotate. Rotation of the permanent magnet causes the shutter flap to rotate, thereby opening the shutter.

A first advantage of the present invention is that rotation motion is the initial motion created by magnetic forces, and the rotation motion is coupled directly to the shutter flap which is rotated to open the shutter.

A second advantage of the present invention is that the mechanism is small and compact, and thereby allows large aperture lenses to be clustered.

A third advantage of the present invention is that the mechanism has a single rotation motion, thereby reducing the adjustment and wear inherent in prior art shutters which utilize a more complex motion.

BRIEF DESCRIPTION OF THE DRAWINGS

FIG. 7 is a top view of a cluster of lens and shutter assemblies;

FIG. 8 is a side view of the cluster of lens and shutter assemblies shown in FIG. 7;

DESCRIPTION OF THE PREFERRED EMBODIMENT

Figure 1:
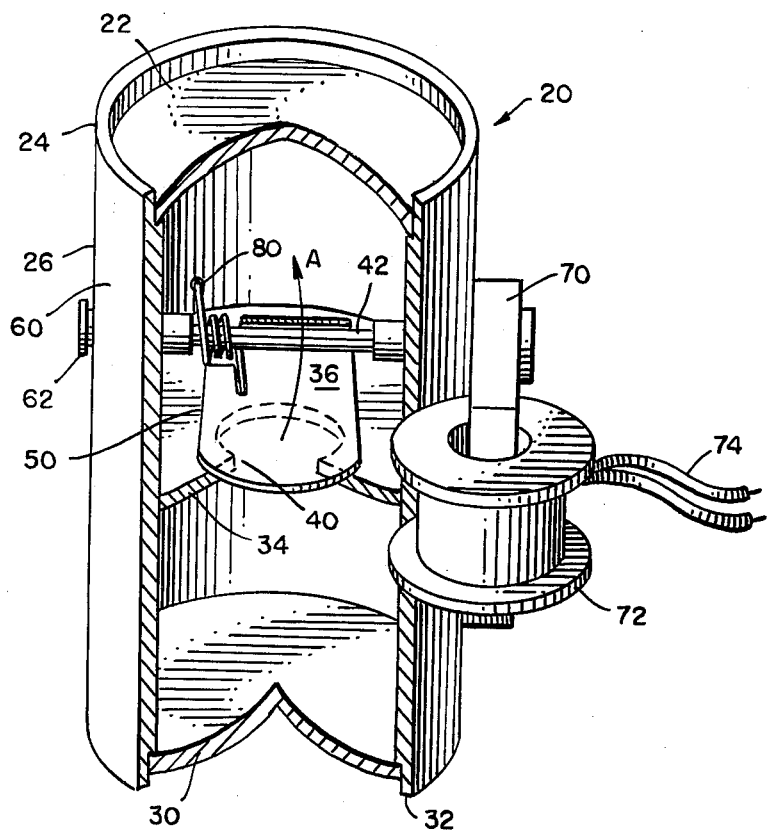
FIG. 1 is a cutaway perspective view of a lens and shutter assembly.
Figure 2:
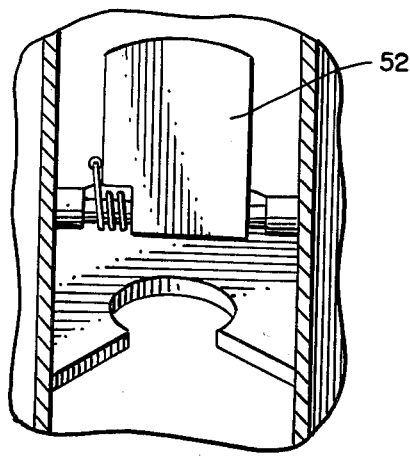
FIG. 2 is a partial view of the assembly shown in FIG. 1 showing the shutter in an open position.
Figure 4:
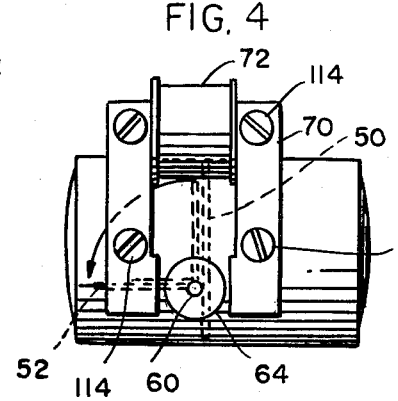
FIG. 4 is a side view of lens and shutter assembly of FIG. 1.

A lens and shutter assembly 20 is shown in FIG. 1 having a first focusing element 22 mounted in a first end 24 of a cylinder 26. A second focusing element 30 is mounted in a second end 32 of the cylinder 26. An optical stop 34 is mounted within the cylinder 26. A flap 36 serves to block a hole 40 within the optical stop 34. The flap 36 is mounted along one edge to a shaft 42. The shaft 42 is rotatably mounted along a side of optical stop 34 in such a way that flap 36 may rotate as illustrated by arrow from a first position 50 shown in FIG. 1 to a second position 52 shown in FIG. 2. Both positions 50 and 52 are shown in FIG. 4 by dashed lines. When the flap 36 is in the first position 50, the flap 36 blocks passage of light through hole 40. When the flap 36 is in the second position 52, light may pass through hole 40 of the optical stop 34.

Shaft 42 is mounted in holes 60 located in cylinder 26. The holes 60 may have bushings 62 inserted therein. Shaft 42 then rotates within bushings 62 with a minimum friction.

Figure 3:
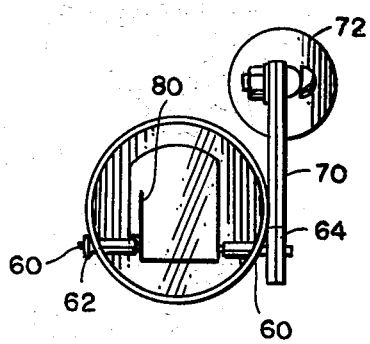
FIG. 3 is an end view of lens and shutter assembly of FIG. 1.
Figure 5:
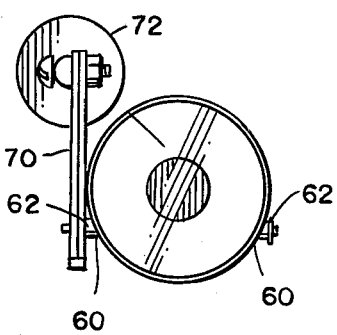
FIG. 5 is an end view opposite FIG. 2 of the lens and shutter assembly of FIG. 1.

A first end of shaft 42 has a permanent magnet 64 fixedly attached thereto. An electromagnet polepiece 70 is attached to the cylinder 26. Polepiece 70 is horseshoe in shape. An electric current carrying coil 72 is mounted around polepiece 70. Wires 74, shown in FIGS. 1 and 8, carry electrical current which is directed to flow through the winding of coil 72. The permanent magnet 64 may be attached to the right end of shaft 42 when the assembly 20 is viewed as shown in FIG. 1, along with polepiece 70 being attached on the right side; or permanent magnet 64 may be attached to the left end of shaft 42 and polepiece 70 mounted on the left side of assembly 20 as shown in FIGS. 3, 4 and 5, when FIGS. 3, 4 and 5 are oriented similarly to FIG. 1.

Spring 80 is mounted upon shaft 42 in such a way as to hold flap 36 in position 50. Whenever shaft 42 is rotated so as to move flap 36 away from position 50 toward position 52, the rotation compresses spring 80 so that when shaft 42 is released, then spring 80 causes flap 36 to return to position 50.

Figure 6A:
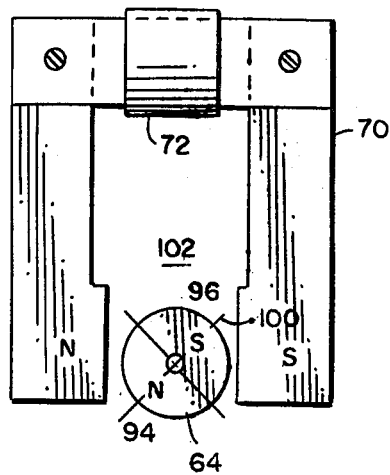
FIGS. 6A and 6B are alternate side views of a portion of the lens and shutter assembly of FIG. 1.
Figure 6B:
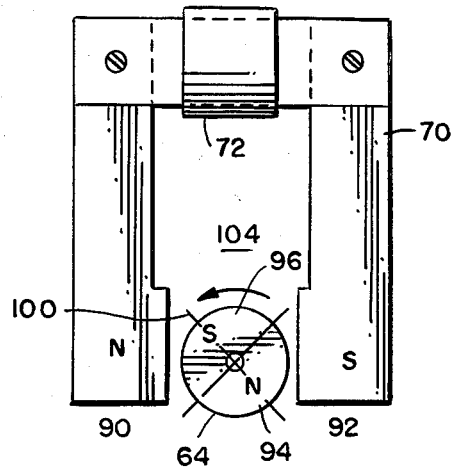
Figure 9:
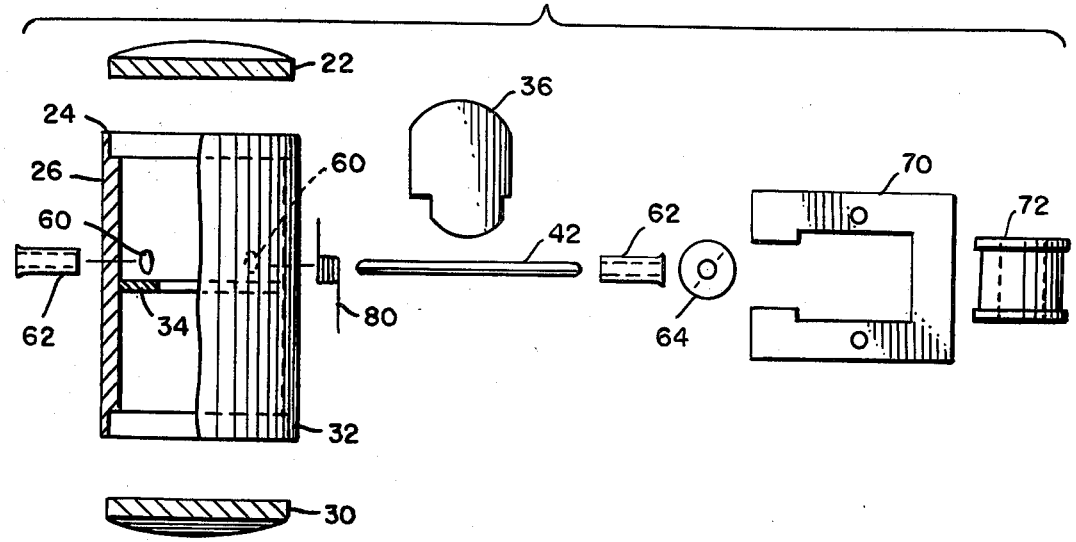
FIG. 9 is an exploded sectional view of the lens and shutter assembly of FIG. 1.

Electromagnetic motion of flap 36 is illustrated in FIGS. 6A and 6B. Polepiece 70 may be magnetized or unmagnetized. If no electrical current flows in coil 72, then polepiece 70 will be unmagnetized, and there will be no force on permanent magnet 64. When electrical current is caused to flow through the winding of coil 72, then the polepiece 70 will be magnetized as a horseshoe magnet and will therefore develop a north pole 90 and a south pole 92. The permanent magnet 64 has a north pole 94 and a south pole 96. The axis 100 of the poles 94 and 96 of the permanent magnet 64 are offset into position 102 from the ends of the horseshoe shaped polepiece 70, as shown in FIG. 6A. Force is developed between the poles 94 and 96 of the permanent magnet 64 and the poles 90 and 92 of the polepiece 70, with the force causing rotation of the permanent magnet 64 so that the axis 100 of the permanent magnet 64 rotates into the new position 104 as shown in FIG. 6B. With the permanent magnet 64 in position 102, the flap 36 is in position 50, closed over hole 40. With the permanent magnet 64 in position 104, the flap 36 is in position 52, unblocking hole 40. Therefore, when no electrical current flows through the windings of coil 72, hole 40 is blocked to the passage of light, whereas when electrical current flows through the winding of coil 72, shaft 42 rotates, thereby unblocking hole 40 to the passage of light.

The shutter assembly 110 comprises hole 40, flap 36, and the other aforementioned parts. The shutter is open when electrical current flows through coil 72 and is closed otherwise.

A cluster of lenses 110 is shown in FIGS. 7 and 8. The cluster 110 is shown as comprising four lens assemblies 20, however a cluster may comprise nine lenses, or sixteen lenses, or 25 lenses, and so forth, for a cluster of lenses corresponding to the format of the images desired on the film. FIG. 8 shows the cluster of lenses 110 with the lens assemblies 20 mounted upon a base plate 112. FIG. 7 shows, in dashed lines, the mounting bolt 114 which secures the electromagnetic polepiece 70 to the cylinder 26. Bolts 114 are also shown in FIG. 4.

Figure 10:
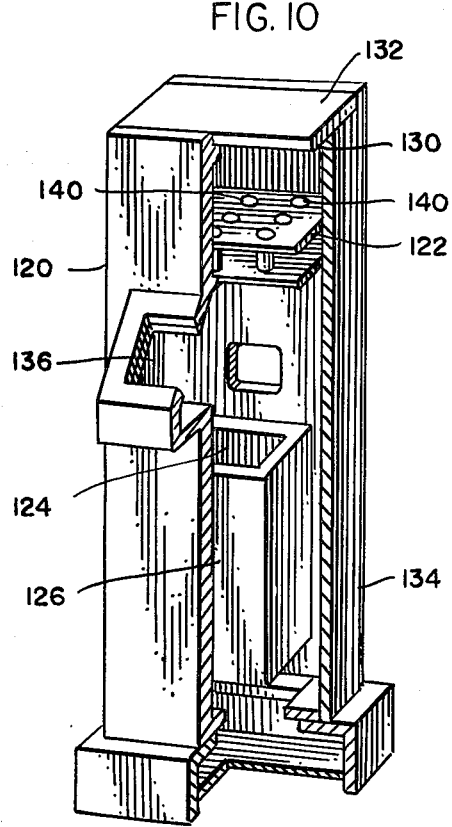
FIG. 10 is a cutaway view of a multiformat imager.

A multiformat image camera 120 is shown in FIG. 10. A cluster of lenses 122 focuses light produced on the screen 124 of oscilloscope 126 upon a photographic film 130 which is supported by a back 132. The cabinet 134 contains a panel 136 for mounting a control system, details of the control system not being shown in the drawings. The cluster 122 contains nine lenses 140 mounted in a square pattern with three lenses 140 along each side. Each lens 140 produces a separate image of screen 124 upon photographic film 130, and the images are laid down in a square array upon photographic film 130.

What is claimed is:

1. An electromagnet shutter for a photographic lens comprising:
    an optical stop mounted at a predetermined distance from the focusing elements of the photographic lens;
    a flap mounted for rotating substantially along one side of said stop, said flap having a first position in which it blocks the passage of light through said stop and a second position in which it is removed therefrom;
    an electromagnetic means for rotating said flap from its first position to its second position,
    wherein said electromagnetic means comprises a permanent magnet mounted on said rotatable shaft and an electromagnet having a horseshoe-shaped core with two poles which surround said permanent magnet whereby, when said electromagnet is energized, the magnetic field produced causes said permanent magnet and attached shaft to rotate, thereby rotating said flap from its first position to its second position.

2. The electromagnetic shutter of claim 1 wherein said flap is fixedly secured at one of its ends to a rotatable shaft located along said one side of said stop.

3. The electromagnetic shutter of claim 1 further comprising a means for returning said flap from its second position to its first position when said electromagnet is deenergized.

4. The electromagnetic shutter of claim 3 wherein return means comprises a spring.

5. A cluster of electromagnetic lenses comprising lens and shutter assemblies which incorporate the electromagnetic shutters as claimed in claim 1.

* * * * *